Figure 1:
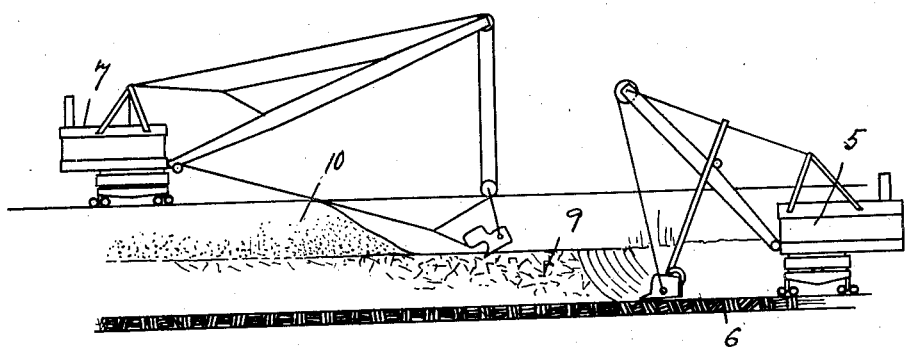

Sept. 11, 1928.

W. C. ROBERTS 1,684,147

METHOD OF STRIPPING

Filed Dec. 17, 1926

2 Sheets-Sheet 1

Inventor

William C. Roberts

By Clarence A. O'Brien
Attorney

Sept. 11, 1928.                 W. C. ROBERTS                 1,684,147
                              METHOD OF STRIPPING
                              Filed Dec. 17, 1926          2 Sheets-Sheet 2
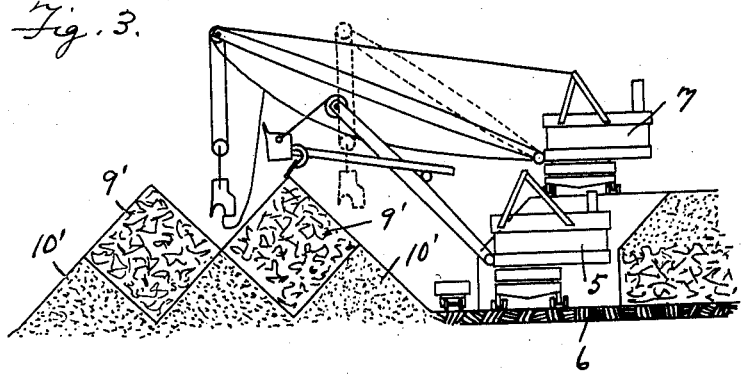
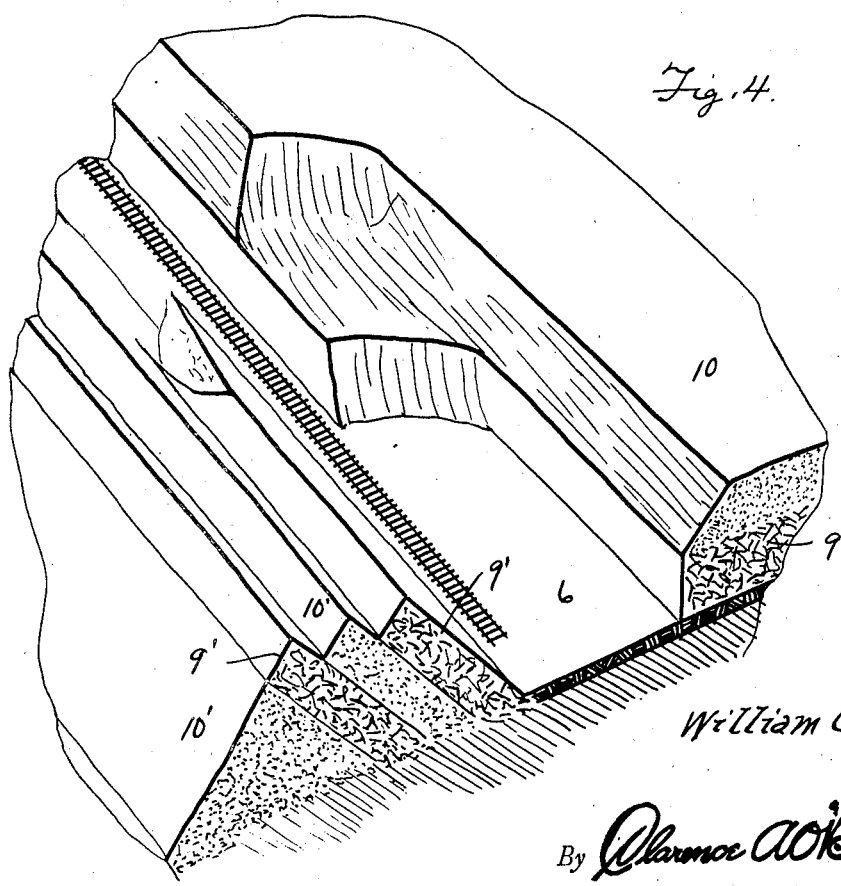
Inventor
William C. Roberts
By Clarence A. O'Brien
        Attorney Patented Sept. 11, 1928.

1,684,147

UNITED STATES PATENT OFFICE.

WILLIAM C. ROBERTS, OF DUQUOIN, ILLINOIS; FLOSSIE ROBERTS EXECUTRIX OF SAID WILLIAM C. ROBERTS, DECEASED.

METHOD OF STRIPPING.

Application filed December 17, 1926. Serial No. 155,540.

The present invention relates to the mining of coal or the like by the stripping method and has for its object to provide an improved stripping method which is safer than that ordinarily used by preventing cave-ins and the like.

Another important object of the invention resides in the method of stripping which is more economical, more reliable, more efficient, and otherwise better adapted than the present known methods.

Another object of the invention lies in an improved method of forming spill piles with the over-burden.

Figure 2:
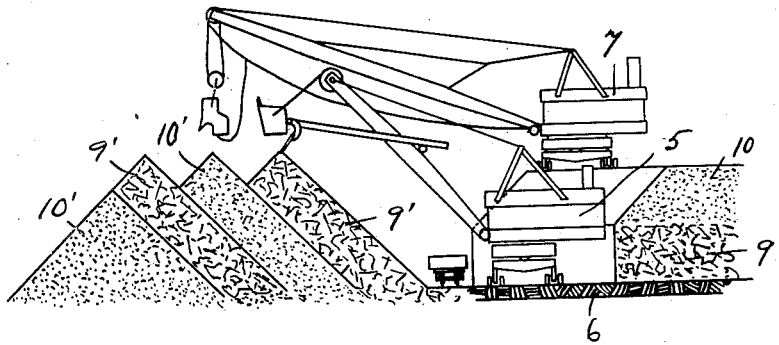

In the drawing:

Figure 1 is a longitudinal section through a strip mine showing the shovel and drag line taking off the over-burden, Fig. 2 is a cross sectional view showing the formation of spill piles, Fig. 3 is a similar view showing another method of forming spill piles, Fig. 4 is a perspective view of a strip mine formed by my improved method.

Generally my method consists in removing the upper portion of the over-burden by means of a drag line and the heavier and lower portions of the over-burden by a shovel. The method, however, may be better understood by an inspection of the drawings wherein it will be seen that the numeral 5 denotes a shovel of conventional formation which is disposed on the coal bed 6. The numeral 7 denotes a drag line which is mounted on top of the over-burden in advance of the shovel 5. Thus the drag line takes off the top over-burden and the steam shovel or electric shovel or any power shovel 5 follows along taking off the lower or heavier over-burden. As is well known by those skilled in this art the upper over-burden usually consists of clay, dirt, or soft material that may be easily handled by the drag line, while the lower over-burden usually consists of hard material, such as rock, slate, shale, and usually all three in the order mentioned beginning at the top. At the present time it is the custom to remove over-burdening by stripping with a shovel which causes numerous cave-ins and is somewhat dangerous and very expensive. These objectionable features are overcome by the use of the drag line and shovel in combination as just specified. The shovel is thus able to take care of the heavier material which is just about of the right height for the shovel and the drag line is particularly adapted to the soft material on top.

In Figure 2 I have disclosed a formation of the spill pile. The throw of the shovel is shorter than the throw of the drag line and with this method it is preferable to put the heavier material from the shovel at the closer range as is disclosed at 9 while the lighter material from the drag line is spilled in behind to the outside of the heavier material as is indicated at 10. The heavier material is less likely to cave in and tends to prevent the caving in of the light material 10 back into the hole or pit dug by the shovel and the dragline in the manner heretofore specified. Several of these spill piles may be formed as is indicated to advantage in Fig. 2. If desired, however the spill piles may be formed as is shown in Figure 3, that is, the piles are first formed by the drag-line as is indicated at 10' and then the heavier material 9' is spilled into pockets formed in the lighter material and holds the same down and prevents cave-ins.

The stripping off of the top over-burden prevents this light material from caving in during the shoveling process. Very frequently in order to shovel out the heavier or hard bottom over burden it is necessary to drill or blast. The stripping off of the light over-burden enables blasting and drilling to be conveniently carried out in a safe manner making the same more cheap than by the present method. Thus, this method of stripping increases the efficiency of blasting and drilling operations in stripping over-burden that contain hard materials. The stripping off of the top light material forms a bench which will extend the distance between the drag line bucket and the shovel dipper, thus giving ample room for drilling and blasting operations, the drag line in operation naturally slopes the top over-burden to prevent slides or cave-ins.

By the use of this simple method the mining is made safer because it eliminates slides. This method enables a lower cost per ton in producing coal or other minable material. Recovery of coal heretofore not considered strippable on account of the heavy or thick over-burden is made possible. Particularly is this so where the over-burden contains a large amount of rock or other hard materials. This method affords an increased efficiency of the stripping shovel due to the top part of the over-burden being taken off by the dragline. This method prevents slides of material from the over-burden by being able to slope the walls to any desired degree so as to prevent them from sliding in. Slides and squashes are prevented in the spill piles due to the fact that the pile may be built so that it will stand up. It is an improvement over the old method.

It is thought that the utility and advantages of this method will now be apparent to those skilled in this art without a more detailed description thereof. It is apparent that slight changes in the method may be resorted to without departing from the spirit or scope of the invention as hereinafter claimed or sacrificing any of its advantages.

Having thus described my method what I claim as new is:

The improved method of stripping overburden which consists first, in removing the top soft portion of the overburden by excavating along the wall of a pit in a direction substantially parallel to said wall and simultaneously sloping said wall upwardly and outwardly to prevent cave ins; second, in removing the lower hard portion of the overburden by excavating in a direction substantially parallel to the wall of said pit.

In testimony whereof I affix my signature.

WILLIAM C. ROBERTS.